Figure 1:
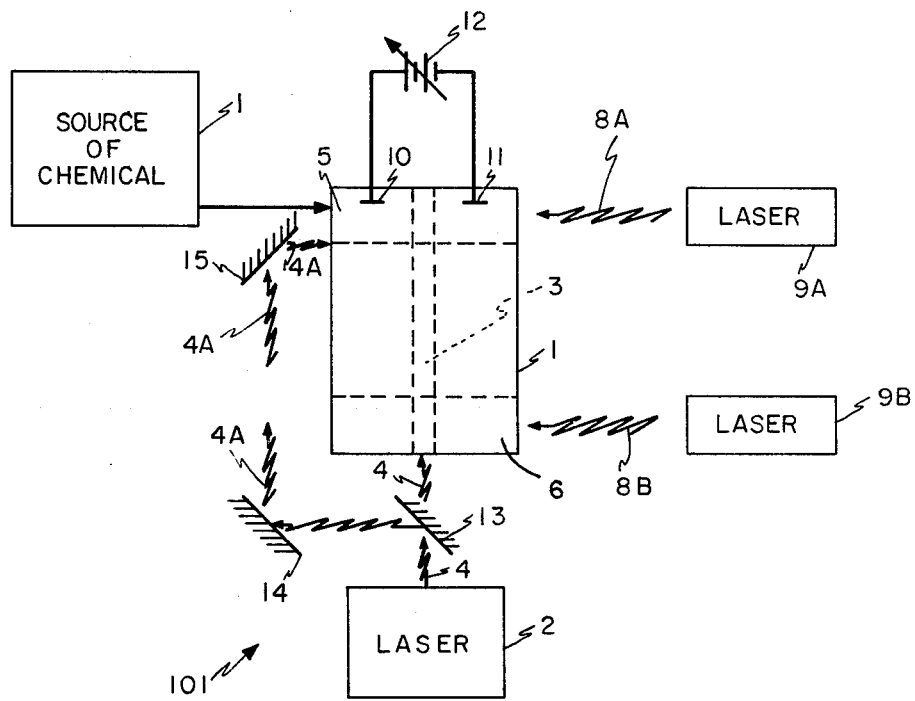

United States Patent [19]

Klein et al.

[11] 4,118,296

[45] Oct. 3, 1978

[54] METHOD FOR MASS SEPARATION OF A GASEOUS MIXTURE

[75] Inventors: Fritz S. Klein, Rehovot, Israel; John Ross, Lexington, Mass.

[73] Assignee: Massachusetts Institute of Technology, Cambridge, Mass.

[21] Appl. No.: 730,550

[22] Filed: Oct. 7, 1976

[51] Int. Cl.² .................. B01J 1/10; B01D 59/16; B01D 59/34
[52] U.S. Cl. .............................. 204/157.1 R; 250/527
[58] Field of Search ............... 204/157.1 R, DIG. 11; 55/81, 17, 2, 20; 250/527

[56] References Cited

U.S. PATENT DOCUMENTS 3,558,877   1/1971   Pressman .................... 204/DIG. 11

Primary Examiner—Howard S. Williams
Attorney, Agent, or Firm—Arthur A. Smith, Jr.; Robert Shaw

[57] ABSTRACT

A method of separation of one gaseous species from another gaseous species in a gas mixture containing a plurality of gases of different masses. The species are first separated from one another by thermal diffusion using laser radiation to effect such separation and then separated from the mixture electrically or chemically. Apparatus to perform the method is also disclosed.

7 Claims, 2 Drawing Figures

METHOD FOR MASS SEPARATION OF A GASEOUS MIXTURE

The present invention relates to mass separation of a gaseous mixture containing a plurality of gases whose masses differ from one another.

A journal article of the present inventors entitled "Concentration enhancement in laser induced mass separation," *Journal of Chemical Physics*, Vol. 63, No. 10, 15 Nov. 1975, p. 4556, accompanies herewith and is hereby incorporated herein by reference.

In a gaseous mixture containing, say, two species, the species may have both different masses and different electronic structures or the two species may have different masses but the same electronic structure. In the latter case, as is well known, the species are isotopes (i.e., either atoms or isotopically substituted molecules). While the techniques herein described are not restricted to mass separation of isotopes, there greatest contribution is in that particular field and hereinafter said techniques are discussed with reference mostly to the field of isotope separation.

Accordingly, it is an object of the present invention to provide a novel method of mass separation as applied to gaseous mixtures containing a plurality of gaseous isotopes.

Still another object is to provide apparatus to perform the foregoing method.

These and still further objects are addressed hereinafter.

The foregoing objects are achieved in a method of mass separation of a gaseous mixture containing a plurality of gaseous species, that comprises subjecting the gaseous mixture to laser radiation to heat a column of gas in the mixture to effect mass separation of one species of the plurality of gaseous species in the mixture from the other species therein. Thereafter, one or the other (or both) of the thusly concentrated species is acted upon to change its chemical nature; the enriched species may be treated chemically by a reaction process, for example, it may be irradiated by laser radiation at the same or a different frequency from the laser beam that provides the heating radiation or by a separate laser beam to ionize or otherwise excite the enriched species, or other known separation processes can be employed.

Figure 2:
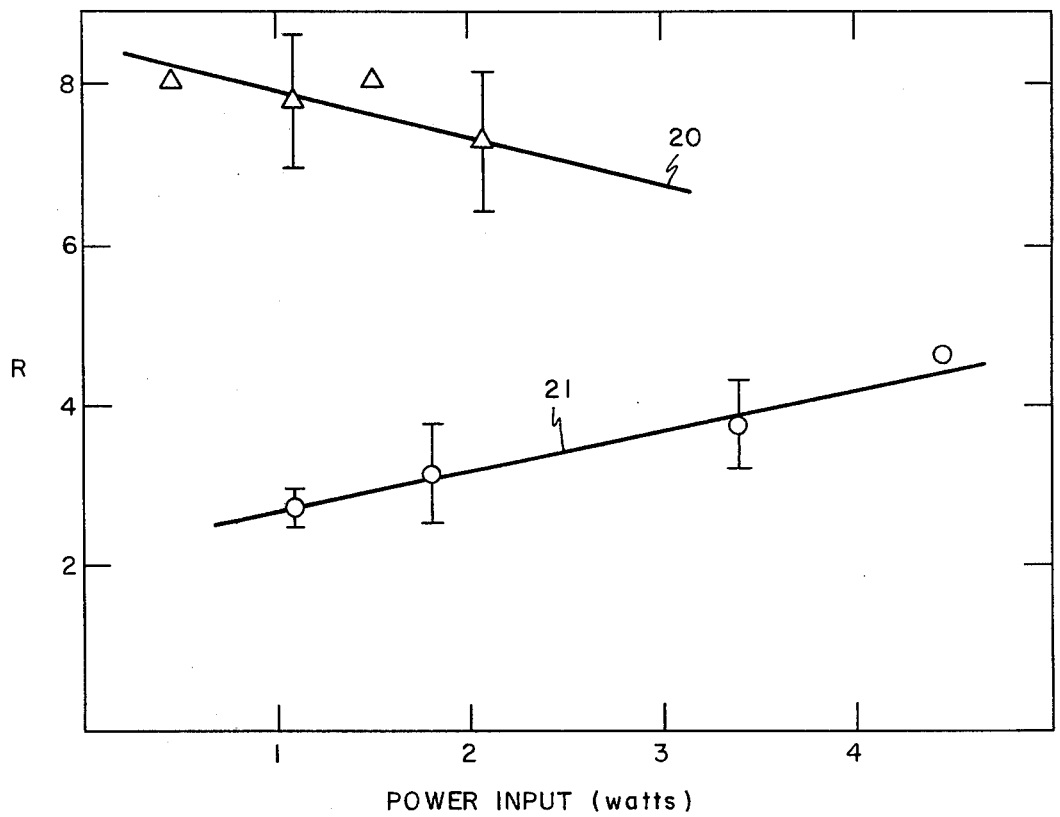

The invention is hereinafter described with reference to the accompanying drawing in which:

FIG. 1 is a diagrammatic representation of a system adapted to perform the techniques of the present invention; and FIG. 2 is a graph showing the relative separation factor as a function of power input as applied to a gaseous mixture containing two different molecules.

In the explanation given in later paragraphs with reference to the system labeled 101 in FIG. 1, let it be assumed that a gaseous mixture is contained within a housing 1 which is transparent to radiation near its cylindrical axis and at other selected areas, as required to admit electromagnetic radiation; let it be further assumed that the mixture contains two gaseous species A and B which are isotopes (i.e., either atoms or isotopically substituted molecules); and let it be assumed that the species A has a lesser mass than the species B. To lay a basis for the explanation of the present inventive contribution, it will be helpful to discuss briefly laser isotope separation as taught by others.

The essence of a laser isotope separation as now practiced is the following. Let it again be assumed that A and B are two isotope species, in the form of a mixture AB in the chamber 1 of FIG. 1. The mixture AB is irradiated with laser light at a frequency $\nu$ absorbed only by A and not by B; the species A, after absorption of a light photon is called A*. The separation of A from B follows then usually one of two paths: (1) A* is further irradiated with light of the same or a different frequency $\nu'$ such that upon irradiation ionization of A occurs; $A^* + h\nu' = A^+ + e^-$ and the separation process proceeds then by electromagnetic techniques; (2) the excited species A* is made to react with another molecule and the products of that reaction are easily separable from B. In either case, it is desirable to maximize the density of A, which maximizes upon irradiation of laser light of given intensity the species A*, which then in turn maximizes the speed of the reaction either in scheme (1) or scheme (2).

The present inventors have found, as hereinafter explained, that the density of the species A can be increased by using, say, the laser for the initial excitation of A in a configuration such that by thermal diffusion in the AB mixture the density of A is enriched in a specified region within the tube or chamber 1 containing the mixture.

Thus, referring to FIG. 1, if the central axis (i.e., the column marked 3) of the chamber 1 is irradiated by the laser light necessary to excite A to A*, then in the steady state a fraction of the excited species A* will by necessity become de-excited due to quenching by collisions and fluorescence. The heat thus liberated by quenching, and a part by fluoresence, re-absorbed and then quenched, is now available to heat the central portion of the cylinder so that by thermal diffusion the enhancement of A in the region labeled 5 may occur. It is important to note that this heating by quenching is normally wasted laser power but is used here beneficially for density enhancement of the species A. In the region where the density of the species A is then increased by thermal diffusion, further irradiation by laser according to the laser scheme (1) or reaction according to the scheme (2) is then made to take place with enhanced efficiency. A more detailed discussion of the system in FIG. 1 now follows.

In the system 101, a first laser 2 is oriented to direct its beam 4 vertically upward into the gaseous mixture to heat the column 3 of gas, the orientation of the beam 4 being such that the column of gas so heated causes or brings about thermal diffusion which effects separation of the first gaseous species A from the second gaseous species B to concentrate the first gaseous species A at the first region 5 and the second gaseous species B at a second region 6 separated from the first region.

The thusly concentrated or enriched species at either the first region 5 or the second region 6 (or both) is then acted upon to effect a change in the chemical nature thereof. By way of illustration, the species A at the region 5 can be acted upon chemically by introducing a chemical from a source 2 to produce a chemical reaction, or the species A can be subjected to further irradiation by a laser beam 8A from a second source 9A (or the species B can be subjected to further radiation 8B from a source 9B), of laser radiation which may be at the same frequency as the beam 4 (see mirrors 13, 14, and 15 placed to direct laser radiation 4A from the laser 2 to the region 5) or a different frequency (see U.S. Pat. No. 3,941,670), or the species A may be subjected to both irradiation and chemical reaction. On the other hand, radiation of the further laser beam 8A may be of sufficient intensity and appropriate frequency to ionize the species A and the ionized species can be separated by, say, electric or magnetic fields introduced at positions 10 and 11. As above indicated, the concentrated species B can be acted upon in the manner given with respect to the species A. The material given below is taken from said journal article.

Laser induced isotope separation, as stated previously herein, requires isotope specific excitation by irradiation; the effect is strongly dependent on the concentration of the required isotope. Any method of increasing that concentration in the irradiated zone increases the separation efficiency. The present invention is directed to a thermal diffusion technique in which the laser radiation can also be used to enhance the concentration of a given species.

To test this diffusion method the inventors used mixtures of $Br_2$—Xe, $Cl_2$—Xe, and $NO_2$—$N_2O_4$. The gas mixture of concentration $C_A$, $C_B$ was placed in a vertical tube (40 cm long, 2 cm diameter). The axial region of the vessel was irradiated by a focused argon ion laser. The establishment of a concentration gradient $\Delta c$ between the top and bottom of the tube was followed by observing changes in light absorption of the mixture. Two filtered light beams from separate light sources, directed perpendicular to the laser beam at the extremities of the tube, were detected by phototransistors (Fairchild FPT 100) in a differential amplifier-recorder system. The curve labeled 20 in FIG. 2 shows the relative mass separation factor $R = \Delta c / c \Delta t$ (for unit time $\Delta t$) vs power of the absorbed laser radiation (power input). To compare these results with mass separation factors obtained by thermal diffusion experiments, the inventors measured that mass separation factor in a identical column in which a Pt wire (0.1 mm diameter, placed on the axis of the tube) was heated electrically; see the curve marked 21 in FIG. 2. The mass separation factor in the laser irradiation is two to three times larger than that in the ordinary thermal diffusion column at the same power input.

It is believed that the mass separation induced by laser irradiation is essentially due to thermal diffusion. The increased efficiency in mass separation by the laser method is probably due to the attainment of higher temperatures in the axial region compared to the heated wire method at comparable power input.

The total system power requirements for the laser induced mass separation by thermal diffusion are of course an order of magnitude larger than those of the heated wire method at the same power input. The point, however, is this: it is suggested that the same laser, without any additional power consumption, can be used in cases of suitable masses and thermal diffusion coefficients, both for concentration enrichment by means of the kind of thermal diffusion technique described here and for separation of a thusly concentrated isotope from the mixture.

Further modifications of the invention herein disclosed will occur to persons skilled in the art and all such modifications are deemed to be within the spirit and scope of the invention as defined by the appended claims.

What is claimed is:

1. A method of separation of mixed isotopic gas species of different masses by enriching the concentration of at least one said isotopic species in a static fluid mixture, which comprises:
   (a) placing the fluid mixture in a chamber;
   (b) subjecting the mixture to a macroscopic process in which a laser beam is directed therethrough to effect an initial enriched concentration of said one isotopic species by thermal diffusion wherein concentration and separation is thus effected by respective differences in temperature produced in the mixture by laser irradiation;
   (c) permitting the said one thus enriched species to collect in a given region of said chamber;
   (d) acting upon said one species to change its nature rendering it responsive to removal from said chamber;
   (e) removing said one species from the chamber.

2. A method of mass separation as claimed in claim 1 that further includes subjecting one of the concentrated species to further selective laser radiation to effect further mass separation thereof.

3. A method of mass separation as claimed in claim 2 wherein the further selective radiation is at the same frequency as the first-named laser radiation.

4. A method of mass separation as claimed in claim 2 wherein the further selective laser radiation is at a different frequency than the first-named radiation.

5. A method as claimed in claim 1 wherein the chemical nature of one of the species is changed by reacting said concentrated species with still another species.

6. A method as claimed in claim 1 that includes subjecting at least one of the concentrated species to selective laser radiation to change its chemical nature and then reacting the thusly changed species with still another species.

7. A method of mass separation of a first gaseous species from a second gaseous species in a mixture containing the two gaseous species, that comprises directing a laser beam into the mixture to irradiate the gases therein and heat a column of gas, the orientation of the beam being such that the column of gas so heated causes thermal diffusion which separates the first gaseous species from the second gaseous species to concentrate the first gaseous species at a first region and the second gaseous species at a second region separated from the first region.

* * * * *